Figure 1:
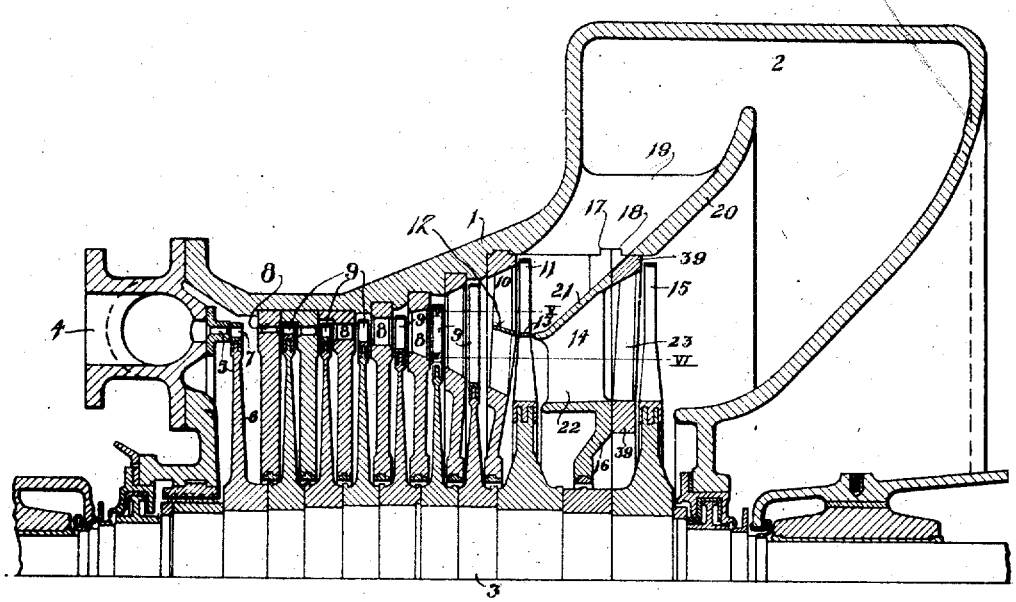

K. BAUMANN.

STEAM TURBINE.

APPLICATION FILED JAN. 20, 1921.

Reissued Apr. 26, 1921.

15,092.

5 SHEETS—SHEET 1.

Karl Baumann
INVENTOR

BY D. C. Davis
ATTORNEY

K. BAUMANN.

STEAM TURBINE.

APPLICATION FILED JAN. 20, 1921.

Reissued Apr. 26, 1921.

15,092.

5 SHEETS—SHEET 2.

Karl Baumann
INVENTOR

BY D. C. Davis
ATTORNEY

K. BAUMANN.

STEAM TURBINE.

APPLICATION FILED JAN. 20, 1921.

Reissued Apr. 26, 1921.

15,092

5 SHEETS—SHEET 3.

Karl Baumann
INVENTOR

BY D. C. Davis
ATTORNEY

K. BAUMANN.
STEAM TURBINE.
APPLICATION FILED JAN. 20, 1921.
Reissued Apr. 26. 1921.
15,092.
5 SHEETS—SHEET 4.
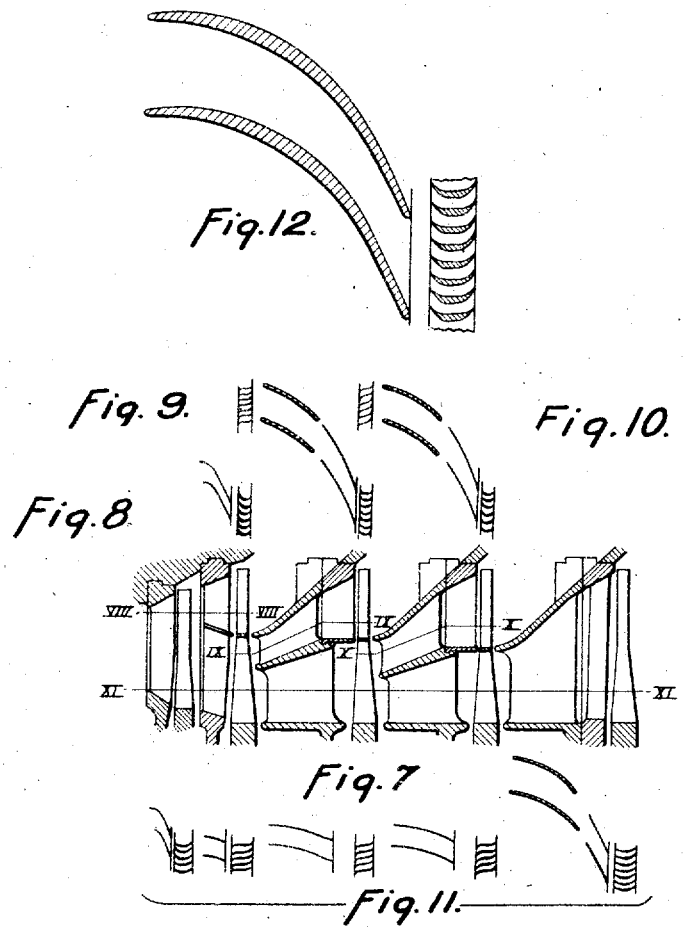
Karl Baumann
INVENTOR
BY C. C. Davis
ATTORNEY K. BAUMANN.
STEAM TURBINE.
APPLICATION FILED JAN. 20, 1921.
Reissued Apr. 26, 1921. 15,092.
5 SHEETS—SHEET 5.
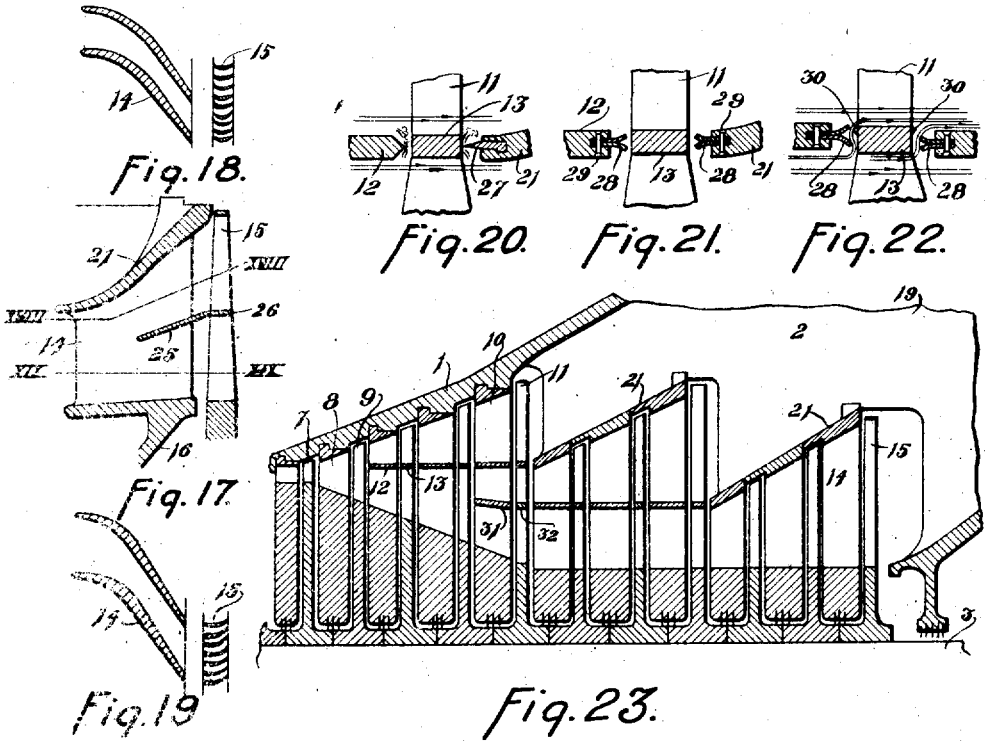
Karl Baumann
INVENTOR
BY O. G. Davis
ATTORNEY

UNITED STATES PATENT OFFICE.

KARL BAUMANN, OF URMSTON, ENGLAND, ASSIGNOR TO METROPOLITAN-VICKERS ELECTRICAL COMPANY, LIMITED, A COMPANY ORGANIZED UNDER THE LAWS OF GREAT BRITAIN.

STEAM-TURBINE.

15,092. Specification of Reissued Letters Patent. Reissued Apr. 26, 1921.

Original No. 1,302,282, dated April 29, 1919, Serial No. 105,409, filed June 23, 1916. Application for reissue filed January 20, 1921. Serial No. 438,743.

*To all whom it may concern:*

Be it known that I, KARL BAUMANN, a citizen of the Confederation of Switzerland, and a resident of Urmston, in the county of Lancaster, England, have invented a new and useful Improvement in Steam-Turbines, of which the following is a specification.

This invention relates to axial flow steam turbines of either the impulse or reaction type, or a combination of these types, and particularly to turbines adapted to work under a high vacuum.

The invention has for its object to provide an improved turbine of this kind in which certain constructional diff lties inherent in a turbine of this type are overcome in a novel and practical manner, and the output for a turbine of a given speed and efficiency is considerably increased.

As is well known, the maximum output which can be obtained in any given turbine is determined by the blade area through which the steam leaves the turbine proper. This blade area is limited by the practical difficulties which are encountered when blades above a certain length are used.

In some cases the outlet angle of the blades has been increased in order to obtain the necessary area for the steam to flow through. This arrangement, however, impairs the efficiency of the turbine.

The last stage or stages of the turbine have also been constructed as a double stage or stages, one-half only of the steam acting in each half of the double stage. In this arrangement the steam in the last stage or stages flows in opposite directions necessitating large and complicated passages for guiding one-half of the steam from the preceding stage to one-half of the divided last stage or stages, and for leading the exhaust steam to the condenser. With this construction the cost of the turbine is considerably increased and losses are caused by the formation of eddies in the steam during its flow through the guiding passages.

According to the present invention the turbine is so constructed that the steam flowing in substantially the same direction throughout a low pressure part passes from a plurality of rows of moving blades to the exhaust.

In carrying out the invention into practical effect one or more of the rows of both stationary and moving blades or of a row of moving blades in a low pressure stage or stages of the turbine, for example, the penultimate and ante-penultimate stages, is or are constructed in multiple tiers or rings, the individual tiers in a row of blades being separated from each other by circumferential dividing walls, so that the steam flowing through such row or rows of blades is segregated into two or more annular portions or belts, the steam flowing through the blades in an outer tier or tiers being expanded at a greater rate at each stage (comprising a row of guide blades or nozzles and its cooperating row or moving blades) than that at which the steam is expanded which flows through the blades or vanes of the adjacent inner tier or tiers of the same row or rows lying nearer the turbine shaft.

With the rows of blades provided with dividing walls as aforesaid, the steam leaving the outer portion of a row of moving blades will in some cases have been fully expanded and passes either direct to the exhaust or through one or more further rows of moving blades in which its remaining velocity energy is abstracted. The steam leaving the adjacent inner portion of the same row of blades will not have been fully expanded and may either be further expanded in a final row or rows of undivided or divided stationary and moving blades from the latter of which it flows to the exhaust, or may be further segregated into one or more portions in one or more succeeding rows of blading some only or all of which are provided with dividing walls, the outer portion or belt of steam leaving the moving blades of some or all of such succeeding row or rows passing direct to the exhaust, the inner portion of steam from the last divided row of blading passing to a final row or rows of blading in which it is fully expanded and thence to the exhaust. It will thus be seen that the steam in an outer tier or tiers is expanded at a greater rate than the steam passing through an inner tier or tiers of the same row or rows of blades.

The arrangement above described in which the rows of blading are provided with circumferential dividing walls so as to form multiple tiers, enables the blading in each of the individual tiers of a row to be so designed as to obtain the best efficiency for the varying peripheral velocities obtaining in each tier. It is, in some cases, however, desirable to design the blading of an inner tier not with the object of attaining the maximum efficiency in that tier but with the object of securing the flow of a large amount of steam through such inner tier, at the same time maintaining the mechanical strength necessary to support the outer tier or tiers of moving blades. This can be done either by not expanding the steam far enough to obtain the best efficiency or by increasing the outlet angle of the blading or in both of these ways.

I have found that a very satisfactory way of accomplishing the above objects is to employ blading of the reaction type in one or more of the tiers and of the impulse type for the other tier or tiers of the same row or rows of blading. For example, for the intermediate rows of blading where considerable differences in the rate of expansion of the steam in the various tiers take place, I prefer to use blading of the reaction type for the inner tier or tiers and blading of the impulse type for the outer tiers. Blading of the reaction type may also be adopted for the inner tier or tiers and of the impulse type for the outer tier or tiers of the final row or rows of blades.

The use of dividing walls which separate the blading of a row into tiers is not restricted in its use to the intermediate row or rows of blading, where the pressure of the steam leaving the blades of the several tiers varies, but may also for structural reasons be advantageously employed in the final row or rows of blading where the pressure at which the steam leaving the blades is substantially uniform over the whole of the blade area in such final row or rows.

In some cases it may be desirable to design the blading in the inner tier or tiers of the intermediate rows to form guide passages only for the steam, the pressure and velocity of the steam being substantially the same at the entry and exit ends of a stage. In other cases the pressure of the steam may be reduced and its velocity correspondingly increased without, however, abstracting any of its energy while passing through the inner tier or tiers of blading. Thus the moving blades of an inner tier or tiers are sometimes so designed that the steam passage between them narrows from both edges, especially from the outlet edges toward the center. At other times the blades are so designed that the passage between them is of approximately constant width.

In other cases the blading is so designed that substantially no change in the direction of the flow of steam takes place during its passage through the stationary blades of the inner tiers, in which cases some or all of such blades may be omitted.

Figure 2:
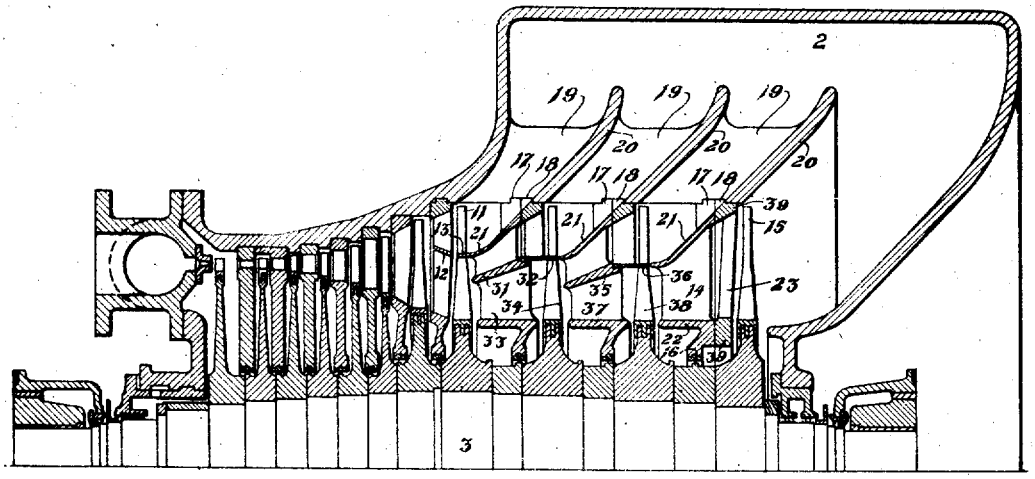
Figure 4:
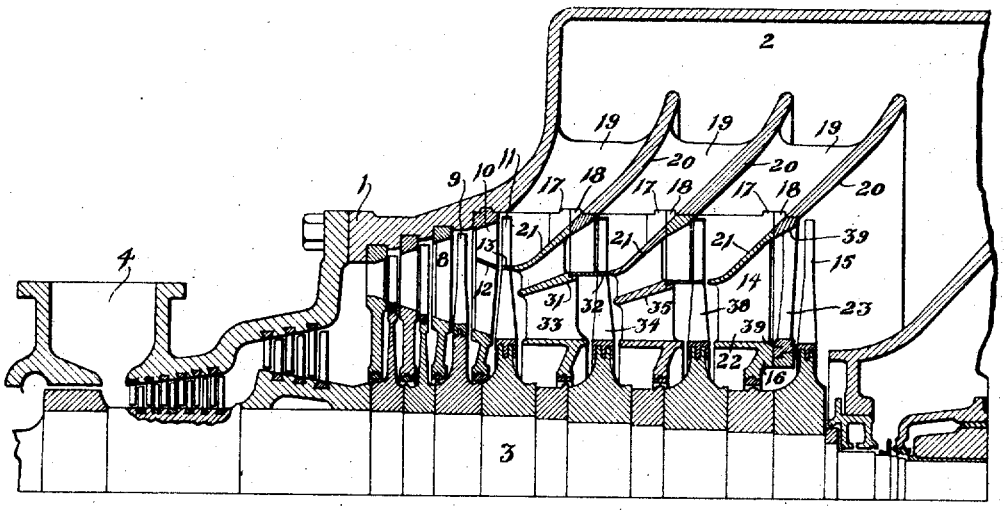
Figure 3:
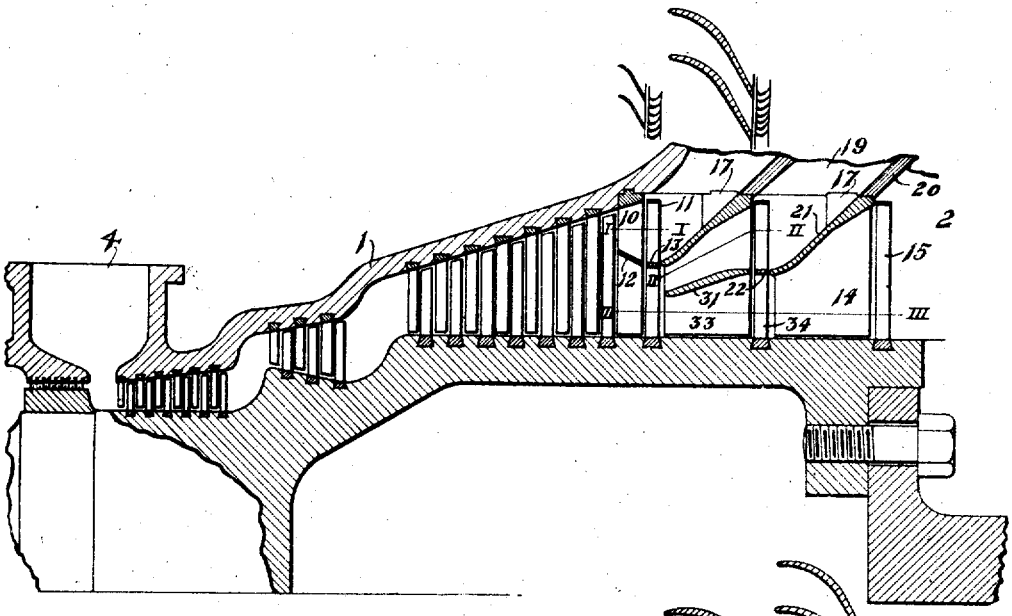
Figure 13:
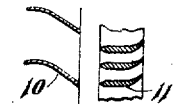
Figure 15:
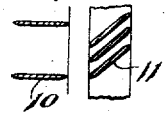
Figure 14:
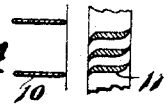
Figure 16:
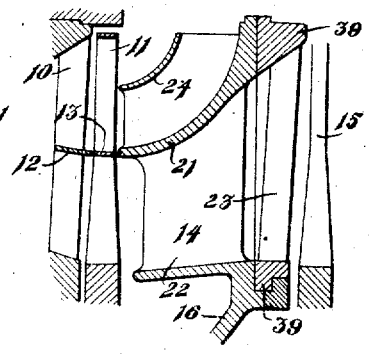
Figure 5:
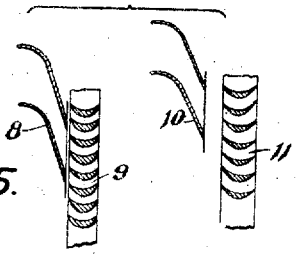
Figure 6:
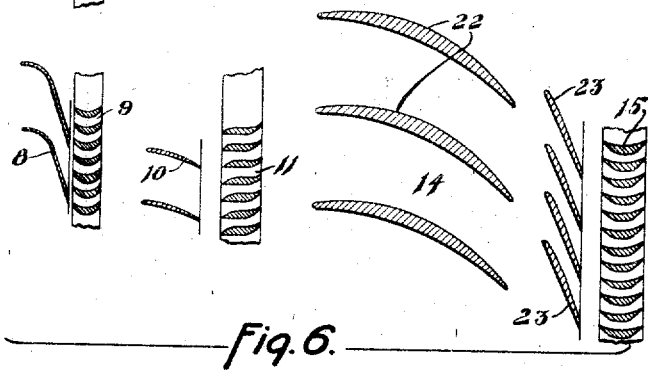

The invention may be carried into effect in a variety of ways, some of which will now be described with reference to the accompanying drawings, in which Figures 1 and 2 are conventional longitudinal sections of the upper half of turbines of the impulse type constructed in accordance with this invention. Fig. 3 is a part of a view similar to those of Figs. 1 and 2, showing the invention applied to a well known type of reaction turbine, and also illustrating sections of parts of the blading. Fig. 4 is a sectional view of a turbine in which the high pressure stages are of the reaction type, and in which the low pressure stages are of the well known disk construction, the blading being either of the reaction or of the impulse type. Fig. 5 is a sectional view on an enlarged scale of the blading on the line V—V of Fig. 1. Fig. 6 is a similar view of the blading on the line VI—VI of Fig. 1. Fig. 7 is a fragmentary reproduction of the last rows of the blading of the turbine illustrated in Fig. 2, Figs. 8, 9, 10 and 11 being sectional views respectively on the lines VIII—VIII, IX—IX, X—X, XI—XI, of Fig. 7. Fig. 12 is a sectional view also on an enlarged scale of an alternative form of blading which may be adopted in place of those shown in Figs. 9 and 10, or of the final row of stationary blades shown in Figs. 6 and 11. Figs. 13, 14 and 15 are fragmentary views showing in section alternative forms of blading which may be used in the inner tiers of blading in the turbines shown in Figs. 1 to 4. Fig. 16 is a detail constructional view hereinafter explained. Fig. 17 is a detail view of Figs. 18 and 19 sections on the lines XVIII—XVIII, XIX—XIX respectively of Fig. 17 hereinafter explained. Figs. 20, 21, 22 are enlarged detail views showing various forms of packing which may be employed between the stationary and moving blades. Fig. 23 is a fragmentary diagrammatic illustration of another form which a turbine, to which the present invention is applied, may take. Similar parts are indicated by the same reference numerals in the various figures of the drawings.

Referring now to Fig. 1, the turbine cylinder is indicated at 1 and the exhaust casing at 2. The turbine shaft is indicated at 3 and the steam inlet at 4. The inlet nozzles are shown at 5 and the first wheel at 6 provided with moving blades 7 as usual. Said nozzles and moving blades comprising the first stage are succeeded by further rows of stationary nozzles 8, 8 and moving blades 9, 9, forming subsequent stages in the usual way. The row of stationary blades 10 and coöperating moving blades 11 are each provided with a circumferential wall 12, 13 respectively, which divide the blades 10, 11 into inner and outer portions. This dividing wall may be formed by providing the blades with lugs or flanges at an intermediate point in their length. The outer portion of the blades 10, 11, forming the outer tier, namely that tier lying farthest from the turbine axis, is designed so as to expand the steam flowing through it at a greater rate than that at which the steam flowing through the inner tier of these blades, namely that tier lying nearer the turbine axis, is expanded. The stationary and moving blades 10, 11 are followed by a further row of stationary blades 14 and coöperating moving blades 15, the former being here shown as consisting of two portions, a main portion 22 and an outlet portion 23. As illustrated, the stationary blades 14 are supported in position in a diaphragm 16 which is held in position by means of lugs 17, 18 engaging with a web 19 extending between the turbine cylinder 1 and a guide wall 20 in the exhaust casing 2. The outer ends of the stationary guide blades 14 in the diaphragm 16 are provided with an inclosing wall or rim 21 which separates the steam passing through the stationary blades 14 from that leaving the outer portions of the moving blades 11.

The operation of the turbine, constructed as above described, is as follows:

The steam admitted through the inlet nozzles 5 flows through the moving blades 7 and then passes through the several stages 8, 9, 8, 9 and so on in succession in the usual way until it reaches the fixed guide blades 10 and moving blades 11 where the steam is divided into two portions by the circumferential walls 12, 13, the outer portion of steam, namely that flowing through the portions of these blades lying farthest from the turbine axis, being expanded to the pressure in the exhaust of the turbine, and passing from the outer portion of the moving blades 11 direct into the exhaust casing 2. The inner portion of steam, that flowing through the portions of the blades 10, 11 lying nearest the turbine axis, is only partially expanded and after leaving the inner portions of the moving blades 11 passes through the stationary guide blades 14 and moving blades 15 in which the steam is fully expanded; and after leaving the moving blades 15 also passes direct into the exhaust casing 2 of the turbine.

The steam leaving the inner portions of the stationary and moving blades 10 and 11 is thus at a higher pressure than the steam leaving the outer portions of said blades and it is necessary therefore that the clearance space between the circumferential guide walls 12 and 13 and between the circumferential guide wall 13 and the outer rim 21 of the diaphragm 16, should be as small as possible. This is best effected by means of a thrust block located as near as possible to the low pressure stages and by providing the edges of the circumferential wall 12 and of the rim 21 with gland strips, several forms of which are hereinafter described and shown in Figs. 20, 21 and 22 of the drawings.

It will be seen that with a turbine constructed and operating as above described, constituting what may be termed a "multiple exhaust turbine", the total area of the moving blades through which the steam leaves the turbine proper is that of the final row of moving blades 15 plus the area of the outer portion of the moving blades 11. In this way the desired increased leaving blade area necessary in order to secure an increased output is obtained without necessitating the employment of a final row of moving blades of inordinately great length or of a divided stage or stages through the blading of which the steam flows in opposite directions.

Alternatively, for the same output a smaller blade angle can be utilized for the leaving stages than with a turbine as heretofore constructed having but a single final row of blades of the same blade height, and thus a better efficiency for the leaving stages, and consequently for the whole turbine, can be obtained.

The energy extracted per unit weight of steam in the outer tiers of stationary blades 10 and moving blades 11 will be approximately equal to the energy extracted per unit weight of steam passing through the inner tiers of stationary blades 10 and moving blades 11 and the succeeding final row of stationary blades 14 and moving blades 15. In the construction illustrated, the steam flowing through the inner tiers of stationary blades 10 and moving blades 11 is expanded at a lower rate than is the steam flowing through the outer tiers of stationary blades 10 and moving blades 11, the remaining expansion of the steam flowing through the inner tiers of said blades taking place in the guide blades 14 and moving blades 15. The mean peripheral speed of the outer tier of moving blades 11 is considerably greater than the mean peripheral speed of the moving blades 15, consequently a greater amount of expansion can efficiently be utilized in said outer tier; in fact the expansion can be distributed in such a manner that the efficiency of said outer tier may be higher than that of the final stage 14, 15.

Figs. 5 and 6 are sections drawn to an enlarged scale showing one arrangement of blading which may be used in the final stages of the turbine illustrated in Fig. 1.

Referring to Fig. 5, the guide blades 8 and moving blades 9 as well as the outer tiers of the blades 10, 11, are of the usual impulse type. In Fig. 6 the stationary blades 8 and moving blades 9 are, of course, the same as the blades 8, 9 in Fig. 5, whereas the stationary blades 10 and moving blades 11 of the inner tiers of those blades are of a type specially designed with a view to passing a large quantity of steam through the available blade area, by which term is meant the total area of the complete ring of blades measured on a plane perpendicular to the shaft. The inner tiers of the blades 10, 11 are also designed for a relatively small expansion only of the steam flowing through them, and also with a view to providing the moving blades with the necessary mechanical strength. In order that a large quantity of steam may passed through them the blade angles adopted for the blades of the inner tiers are considerably greater than the blade angles adopted for the outer tiers. The expansion in the inner tiers of this stage occurs mainly in the moving blades 11 in which the steam velocity is increased beyond that existing in the inner tier of the guide blades 10, as the space between the moving blades is reduced on account of the thickness which it is desirable to give to the inner portions of said blades to afford the necessary mechanical strength.

In order to obtain the maximum strength of the blades for a given steam velocity it is necessary to arrange that the expansion shall take place chiefly at the entrance of the passages between the moving blades 11, and that the velocity shall remain practically constant while the steam is passing through the remaining portions of the passages between the blades, the leaving angle being arranged as shown in Fig. 6 so that the width of the remaining portions of the passages between the blades is practically constant.

The final rows of guide blades 14 and moving blades 15 are, as shown in Fig. 6, of the usual type as regards the blade angles employed. It is, however, necessary to increase the width of the guide blades 14 and consequently the distance between the moving blades 11 and 15, in order to avoid the formation of eddies and obtain a satisfactory flow of the steam passing through said guide blades, as well as to provide the necessary space for the steam leaving the outer tier of moving blades 11. In the construction shown in Figs. 1 and 6, the guide blades 14 consist of two portions, namely main portions 22 which, in the construction shown, are cast in one piece with the diaphragm 16, and outlet portions 23, which are preferably formed separately and either cast or afterward inserted into a frame 39 forming part of the diaphragm 16. The stationary blades 14 need not, however, necessarily be constructed in two portions, as shown in Fig. 6, but may be formed as shown in section in Fig. 12, in one piece.

In some cases, in order to provide the necessary strength the moving blades 11 and the final row of moving blades 15 may be made to taper in width as shown in Fig. 1, or in thickness, or in both of these dimensions along the whole or a portion of their length, increasing in section toward the root of the blades. Advantageously these blades may be constructed as described in the specification of British Patent No. 14,051 of October 4th, 1915.

Alternative designs for the inner tiers of stationary blades 10 and moving blades 11 shown in Fig. 6, which in certain cases may be adopted, are illustrated in Figs. 13, 14 and 15.

Fig. 13 shows a design in which the outlet angle of the guide blades 10 is smaller than in Fig. 6 and is such that having regard to the velocity of the moving blades 11, relative to that of the guide blades 10, the steam enters said moving blades in an approximately axial direction. In this design a relatively greater part of the expansion occurs in the guide blades 10 than in the corresponding guide blades 10 shown in Fig. 6. The inlet portions of the moving blades 11 are reduced to an edge as shown, so as to prevent eddies where the steam meets the edges of the blades. The expansion through the moving blades 11 takes place chiefly at the inlet portion of the blades, as is the case with the blades 11 shown in Fig. 6, practically no expansion taking place during the passage of the steam through the remaining portion of the moving blades 11 of Fig. 13, the leaving angle being arranged as shown so that the width of the remainder of the passage between the blades remains practically constant.

In the design shown in Fig. 14 no change in the direction of the steam takes place during its passage through the guide blades 10.

The blades can, as shown, be flat and located in a plane parallel with the axis of the turbine, or they may be inclined in either direction with respect to the turbine axis. As no appreciable change in the direction of the steam takes place some or all of the blades 10 may be omitted. If these blades are omitted the velocity of the steam may be varied as desired either by decreasing or by increasing the radial height of the passage. If the inner tier of guide blades is omitted some means for directing the steam flowing from one row of moving blades to the next, to take the place of the inner circumferential wall of the guide passages, must be provided. This may take the form of a cylinder extending between adjacent rows of moving blades and suitably supported in the proper position from the shaft or from the wheels.

The moving blades 11 shown in Fig. 14 are designed in such a manner that no expansion of the steam during its passage through them takes place and the direction of the steam leaving is the same as the direction of the steam entering the blades, no mechanical energy being abstracted from the steam during its passage through them, and consequently no appreciable change in its pressure occurs. The moving blades 11 are of an *f* shape, as shown, the central portion being straight and of uniform thickness, and the sides reduced to an edge so, that the steam passage between two adjacent blades is of practically constant width. This design enables blades of the necessary mechanical strength to be provided which do not change the velocity of the steam to any extent during its passage between them.

The guide blades shown in Fig. 15 are of the same type as those shown in Fig. 14. The moving blades 11 are flat and more or less inclined relative to the axis of the turbine, being reduced to a fine edge at both sides, especially at the outlet side, the center portion of the blades being preferably of substantially uniform thickness. A passage is thus formed between adjacent blades in which the pressure of the steam is reduced at the entrance of the blades and the velocity increased as it flows toward the middle portion of the passage the velocity being reconverted into pressure by the gradually increased width of the passage toward its outlet.

This design of moving blades lends itself particularly to the construction in which the inner tier of blades is made solid with the turbine disk or shaft, the outer tier of moving blades being secured to the rim of the disk or shaft by rivets or in any other suitable manner.

The various designs which the blading of the inner and outer tiers of a row and the final row may take, described above with reference to Figs. 5, 6, 12, 13, 14 and 15, have been given by way of example and as indicating some of the more advantageous designs which can be employed. The blading of the circumferentially divided tiers may sometimes be of the same character in two or more of the individual tiers of a row. The expansion however taking place at different rates in the several tiers of a row. The blades may in some cases also have the same inlet and outlet angles in the various tiers of a row. Frequently also it will be found advisable to provide an outer tier of a row with a greater number of blades than an inner tier of the same row.

Fig. 16 shows a modified form which the outer inclosing wall of the stationary blades may, with advantage, assume. The outer wall or rim 21 is here shaped so as to change the direction of the steam leaving the outer tier of the moving blades 11 from a substantially axial into a substantially radial direction during its passage to the exhaust casing. In order to prevent, as far as possible, the formation of eddies, due to the rapid change of direction of the steam, an additional guide 24 may be provided which will separate the steam flowing to the exhaust into two portions. More than one of such additional guides may of course be used if desired, and they need not necessarily be supported from the inclosing rim 21, as here illustrated, but may be attached to the turbine cylinder or exhaust casing. One or more simliar guides to that shown at 24 in Fig. 16 may be provided for directing the steam leaving the last row of moving blades 15. The shape given to the inclosing rim 21 and curved guide 24 will obviously depend upon the direction in which it is desired the steam leaving the moving blades should flow toward the exhaust, as the change in the flow of the steam need not necessarily be from an axial into a radial direction.

Fig. 17 shows a further modified construction of the final guide blades 14 and moving blades 15, an additional circumferential dividing wall 25 being provided extending over a part or the whole width of the guide blades 14 and corresponding dividing wall 26 separating the moving blades 15 into the inner and outer tiers. The stationary and moving blades of the outer tiers are again of the impulse type and those of the inner tiers are of the reaction type. The blades of the inner and outer tiers are respectively shown in section in Figs. 18 and 19, these figures being taken on the lines XVIII—XVIII, XIX—XIX of Fig. 17. This combined use of impulse and reaction blading in one and the same row is, in some cases, also adapted to obtain the best efficiency for the last stage of the turbine, as well as mechanical strength for the roots of the moving blades, blading of the reaction type being more suitable for the inner tier owing to the relatively higher steam velocities obtained in the passages between the moving blades which enables the roots of the moving blades to be made stronger. In other cases the same type of blading will be used for both inner and outer tiers but the outlet angles of the stationary blades in the inner and outer tiers may be different. I sometimes omit the stationary dividing wall 25 but retain the dividing wall 26 in order to separate the steam flowing through the inner and outer portions of the moving blades and prevent eddies which may arise due to the great difference in steam velocities resulting from the great difference in the peripheral velocities between the inner and the outer tier.

Fig. 20 shows on an enlarged scale the type of packing shown in Fig. 1 as being used between the circumferential dividing walls of the stationary and moving blades 10, 11 and between the moving blades 11 and the inclosing wall 21 of the stationary blades 14. As shown in this figure the side of the circumferential wall 12 adjoining the circumferential wall 13 is sharpened to a knife edge so as to reduce the danger of heating in case rubbing takes place between the walls 12 and 13. The inclosing rim 21 is shown as being provided with a gland strip 27 of a well known type for a similar reason.

Fig. 21 shows an alternative form of packing strip 28 of a well known type which may be employed. The packing strips 28 are, however, in this case secured to the circumferential walls 12 and 21 by rivets 29 thus providing a very substantial mechanical design and one in which the replacement of the strips where necessary is much facilitated.

Fig. 22 shows a further arrangement in which the circumferential wall 13 is provided with projections 30 which are so located with respect to the packing strips 28 as to guide any leakage steam in substantially the same direction as the working steam passing through the turbine. The direction in which any leakage steam will be caused to flow with the arrangement shown in this figure is indicated diagrammatically by the stream lines.

Referring now to Fig. 2, this shows a construction which may be adopted in those cases where it is necessary to pass greater volumes of steam through the low pressure stages of the turbine than in the case of the turbine described with reference to Fig. 1. In other words, for similar steam conditions and efficiencies the output of the turbine can, with this construction, be considerably increased. In the turbine shown in Fig. 2 the steam flowing through the inner tiers of the circumferentially divided stationary and moving blades 10, 11 is further segregated by circumferential division walls 31, 32 in the succeeding stage comprising a row of fixed blades 33 and moving blades 34. The steam passing through the outer tier of the stationary and moving blades 33, 34 is expanded down to the pressure in the exhaust to which it directly flows on leaving the outer tier of moving blades 34. The steam expanding at a low rate during its passage through the inner tiers of the stationary and moving blades 33, 34 is again segregated into two portions by circumferential dividing walls 35, 36 in a further succeeding stage comprising stationary and moving blades indicated at 37, 38, respectively. The steam passing through the outer tier of the stationary and moving blades 37, 38 is expanded down to the pressure of the exhaust and on leaving the outer tier of moving blades 38 passes direct into the exhaust casing 2. The energy remaining in the steam after flowing through the inner tier of the stationary and moving blades 37, 38 in which it is expanded at a low rate is utilized in a final stage comprising stationary blades 14 and moving blades 15 in a manner already described with reference to Fig. 1.

It will be seen that in a turbine constructed as shown in Fig. 2 the total blade area through which the steam leaves the turbine proper is approximately increased by the blade areas of the outer tiers of the moving blades 34 and 38 as compared with the construction illustrated in Fig. 1.

One arrangement of blading which may be adopted in a turbine of the kind illustrated in Fig. 2 is shown for example in Figs. 7 to 11, inclusive. Fig. 7 it will be seen is a reproduction of some of the low pressure stages of Fig. 2 and Figs. 8, 9, 10 and 11 are sections of the blading in Fig. 7 taken respectively on the lines VIII—VIII, IX—IX, X—X and XI—XI. The manner in which the turbine described and illustrated in Figs. 2, 7, 8, 9, 10 and 11 operates will be readily understood from what has been said in connection with Figs. 1, 5, 6 and 12, it being understood that in the turbine illustrated in Figs. 2, 7, 8, 9, 10 and 11 also various alternative designs and combinations of blading may be used as hereinbefore fully set forth.

One example of how the invention may be applied to a turbine in which the whole of the blading is of the reaction type is illustrated in Fig. 3, the construction and operation of which, taken in conjunction with the sectional views of the blading in the low pressure stages on the lines I—I, II—II and III—III and designated by these numerals respectively, will be easily comprehended without further detailed description.

Fig. 4 illustrates still another form of turbine constructed in accordance with this invention in which the high pressure stages are of the usual reaction type and the low pressure stages are of the well known disk construction, the blading being of either the impulse or reaction type or a combination of these types.

In the construction illustrated in Figs. 1, 2 and 4 the moving blades of the low pressure stages are shown as being attached to separate disks mounted on the shaft 3. In some cases it is preferable to attach some or all of such moving blades directly to the shaft itself, the shaft in such cases being increased in diameter and provided with flanges or collars to which the moving blades are secured in any suitable way. In these figures also a single exhaust casing only is shown into which the steam leaving the several rows of moving blades passes. It is to be understood however that the steam leaving the various rows of moving blades may pass to separate exhaust casings and in some cases to separate condensers, if desired.

A still further constructional form which the invention may take is shown diagrammatically in Fig. 23. In the turbine diagrammatically indicated in this figure it will be seen that the segregated annular portions of steam each flow through a plurality of rows of fixed and moving blades before reaching the pressure of the exhaust and passing to the exhaust casing of the turbine. It will also be observed that in one row of stationary and moving blades the steam is segregated into three annular portions, the stationary and moving blades in question being constructed as a triple tier. The blading may be arranged in such a way that the ratio of the steam velocities and peripheral velocities obtaining in the various tiers is approximately constant, thus obtaining a uniform efficiency over the whole of the various rows of blades.

From the examples hereinabove described and illustrated it will be evident that the steam flowing through the working passages of a turbine constructed in accordance with this invention is divided into separate portions forming more or less complete and partially overlapping belts of steam, the outermost belt or belts while passing through the operative blading of the turbine being expanded at a greater rate than the inner belt or belts lying nearer the axis of the turbine. The steam in the outer belt or belts is let away separately to the exhaust immediately it has been expanded to the full extent, and its velocity energy abstracted therefrom.

Stated in other words, the belts of steam flowing through the turbine while in operation may be likened to a plurality of truncated hollow cones, the steam forming the smaller end of the second and any succeeding cones being derived from the steam of the preceding cone. At the base of each of such cones the steam will have been fully expanded and is conducted away to the exhaust. Thus the steam will be led away to the exhaust from a plurality of independent rows of moving blades.

As hereinabove set forth turbines of either the impulse or reaction type, or a combination of those types, may be constructed in accordance with this invention and although the invention is an improvement in turbines of the axial flow type it is to be understood that the high pressure or other sections of the turbine to which the invention is not applied may, if desired be of any other suitable type. The invention is especially applicable to exhaust turbines or mixed pressure turbines where the volume of steam passing into the condenser is relatively large, and may also be applied to turbines constructed as double flow turbines in which portions of the steam flow in opposite directions to the exhaust. In short, the invention may be applied to axial flow steam turbines of many of the various existing types adapted to operate at a high vacuum in which, as heretofore constructed, in order to obtain a large output, blades of inordinately great length would have to be used.

In the modifications illustrated it will be seen that the low-pressure motive fluid is segregated into a plurality of portions which discharge through successive rows of blading. In this way, the leaving blade area in the low-pressure part of the turbine may be increased to an extent heretofore impossible.

Having now particularly described and ascertained the nature of my said invention and in what manner the same is to be performed, I declare that what I claim is:

1. In a turbine, the combination of a plurality of successively arranged stages having the motive fluid passing therethrough in approximately the same direction including rows of moving blades and means to increase the leading blade area including means to discharge steam from a plurality of said rows of moving blades directly to the exhaust.

2. In a turbine having a single exhaust, a low-pressure part having the steam flowing therethrough in substantially the same direction including a plurality of successively arranged rows of moving blades and means whereby steam flows from each row of moving blades directly to the exhaust.

3. A fluid turbine of the axial flow type in which the steam flows substantially in the same direction throughout including a low-pressure part and means associated with the low-pressure part for segregating the fluid into a plurality of annular portions and for expanding the portions at different rates, the portions passing from the plurality of rows of moving blades to the exhaust.

4. In a turbine, a low-pressure part including means for passing the motive fluid therethrough in annular portions and in approximately the same direction, the range of expansion in each portion being approximately the same, and stationary and moving rows of blades for each portion, there being a greater number of rows of blades in one annular portion than in another.

5. In a turbine having a high-pressure part and a low-pressure part, the low pressure part including a plurality of successively arranged rows of moving blades and means to divide the steam discharged from the high-pressure part into a plurality of portions, energy from each portion being abstracted by a separate row of blades and all of the annular portions discharging to a common exhaust chamber.

6. In a turbine having a high-pressure part and a low-pressure part, the low-pressure part including a plurality of successively arranged rows of moving blades and means to divide the motive fluid flowing from the high-pressure part into a plurality of annular portions or belts flowing approximately in the same direction, energy being abstracted from each of the annular portions or belts by a separate row of moving blades and all of the annular portions or belts discharging into a common exhaust chamber.

7. In a turbine, the combination of a low-pressure part including a plurality of rows of blades and means for dividing some of the rows into inner and outer tiers and for segregating the steam passing therethrough into inner and outer portions, the inner portion or portions passing to the exhaust through a greater number of rows than the outer portion or portions.

8. In a turbine, a low-pressure part having the steam passing therethrough in approximately the same direction including inner tier blading, outer tier blading, and last row blading, the motive fluid being expanded mainly in the outer tier and last row blading and the inner tier blading serving to discharge motive fluid into said high expansion blading.

9. In a turbine, a low-pressure section comprising one or more successively arranged stages including superposed rows of moving blades, adapted to divide the motive fluid into a plurality of annular portions or belts and abstract energy from the belts passing therethrough, and other stage or stages, the inner portion or portions of the superposed blading adapted to pass steam to said other stage or stages.

10. In a turbine, a low-pressure part comprising a plurality of successively arranged rows of stationary and moving blades, and means associated with said blades to divide the steam into successive annular portions or belts for passage through successive rows of moving blades to the exhaust.

11. In an axial flow turbine, a low-pressure part including a plurality of rows of stationary and moving blades arranged in succession and means associated with one or more of the rows of blades to segregate the steam passing therethrough into a plurality of annular portions or belts which pass directly from the moving rows of blades to the exhaust.

12. In a turbine, a low-pressure part having the motive fluid passing therethrough in substantially the same direction, a pair of rows of stationary and moving blades, means to divide the motive fluid into inner and outer annular portions for passage through the moving blades, a row of stationary blades receiving the inner annular portion of motive fluid, a shroud carried by the latter blades and coöperating with the turbine casing to define an exhaust for the outer annular portion of motive fluid, said last-named blades being sufficiently wide to provide an adequate exhaust.

13. In a fluid turbine, a low-pressure part including a plurality of stages in which the motive fluid flows in approximately the same direction and means associated with one or more of said stages to divide it or them into inner and outer tiers and to segregate motive fluid passing therethrough into a plurality of annular portions or belts, the annular portion or portions passing through some tier or tiers being expanded at a greater rate than the annular portion or portions passing through the outer tier or tiers and the annular portions or belts passing from the moving rows of blades of said stages directly to the exhaust.

14. In an axial flow fluid turbine, a low-pressure part including a plurality of stages in which the fluid flows in substantially the same direction, circumferential wall or walls associated with the stage or stages to divide the stage or stages into inner and outer tiers and to segregate the motive fluid passing therethrough into a plurality of annular portions or belts, the annular portion or portions passing through the outer tier or tiers being expanded at a greater rate than the annular portion or portions passing through the inner tier or tiers and the annular portions passing directly to the exhaust from the moving rows of blades of said stages.

15. In a turbine, a low-pressure part having the motive fluid passing therethrough in approximately the same direction including a plurality of rows of moving blades and means for dividing one or more of said rows into inner and outer tiers, the motive fluid being expanded at different rates in the inner and outer tiers and passing from preceding inner tiers to succeeding outer tiers and another row of moving blades.

16. In a turbine, a low-pressure part having motive fluid passing therethrough in approximately the same direction including moving rows of blades and means associated with one or more of said rows of blades to divide it or them into inner and outer portions and to segregate the motive fluid into annular portions, the motive fluid expanding in one blade portion at a greater rate than in another and all of the annular portions of motive fluid being expanded to exhaust pressure upon discharge from the moving rows of blades.

17. In a fluid turbine, a low-pressure part having steam flowing therethrough in substantially the same direction and including a plurality of rows of stationary and moving blades, one or more circumferential dividing walls associated with one or more of said rows of blades for dividing them into inner and outer tiers and segregating the steam into two or more annular portions or belts, the outer tier or tiers adapted to expand steam at a greater rate than the inner tier or tiers, and said annular portions or belts passing from a plurality of moving blades to the exhaust.

18. In a fluid turbine, a low-pressure part including a plurality of rows of stationary and moving blades and means associated with one or more of said rows of blades to divide it or them into inner and outer tiers and to segregate the motive fluid passing therethrough into a plurality of annular portions, the annular portions passing through the outer tier or tiers being expanded at a greater rate than the annular portions passing through the inner tier or tiers, and all of the annular portions discharging from the rows of moving blades directly to the exhaust.

19. In a fluid turbine, a low-pressure part including a plurality of rows of stationary and moving blades and circumferential walls coöperating with a plurality of rows of said blades to divide the latter into inner and outer tiers and to segregate the motive fluid passing therethrough into a plurality of annular portions or belts, the blades of an outer tier having the outlet angles thereof less than the outlet angles of the blades of an inner tier whereby the motive fluid will be expanded at a greater rate in the outer tier than in the inner tier, and the annular portions or belts passing from the moving rows of blades directly to the exhaust.

20. In a fluid turbine, a low-pressure part having the steam passing therethrough in substantially the same direction including a plurality of rows of stationary and moving blades and circumferential walls associated with a plurality of rows of said blades to divide them into inner and outer tiers and to segregate the motive fluid passing therethrough into a plurality of annular portions, the blades of an outer tier being of the impulse type and the blades of an inner tier being of the reaction type whereby motive fluid will be expanded at a greater rate in the outer tier than in the inner tier and the annular portions or belts of motive fluid passing from the moving rows of blades directly to the exhaust.

21. In a fluid turbine, a low-pressure part having steam flowing therethrough in substantially the same direction and comprising a plurality of rows of stationary and moving blades, means for dividing one or more of said rows into multiple tiers and for segregating the fluid passing therethrough into a plurality of annular portions, the blading in one or more of the tiers in a row being of the impulse type and the other tier or tiers being of the reaction type whereby the fluid may be expanded at a lesser rate in the other tier or tiers, the annular portions or belts passing from a plurality of rows of moving blades to the exhaust.

22. In a fluid turbine, a low-pressure part including a plurality of rows of stationary and moving blades passing motive fluid in substantially the same direction, means associated with said rows of stationary and moving blades to divide the latter into inner and outer tiers and to segregate the steam passing therethrough into inner and outer annular portions or belts, and a last pair of rows of stationary and moving blades receiving steam from an inner tier, the steam expanding in said outer tier or tiers and in said last pair of rows being at a different rate than in the inner tiers.

23. A steam turbine comprising a casing, a rotor, one or more stages or sections carried thereby, a pair of rows of stationary and moving blades carried thereby and receiving steam from the last of said stages, wall elements associated with the stationary and moving blades to divide the latter into inner and outer tiers and to segregate the steam into inner and outer belts, the outer tier of stationary and moving blades adapted to expand and abstract energy from the outer steam belt, and a second pair of rows of stationary and moving blades carried by the rotor and casing and adapted to receive steam from the inner tier, the expansion of the outer steam belt in the outer tier being approximately equivalent to the expansion of the inner belt in the inner tier and in the second pair of rows of blading.

24. In a fluid turbine, a low-pressure part including a plurality of rows of stationary and moving blades passing motive fluid in substantially the same direction, means associated with said rows of stationary and moving blades to divide the latter into inner and outer tiers and to segregate the steam passing therethrough into inner and outer annular portions or belts, and a last pair of rows of stationary and moving blades receiving steam from an inner tier, the steam expanding in said outer tier or tiers and in said last pair of rows being at a different rate than in the inner tiers, the moving blades being tapered from the roots toward the tips to provide blading structure of relatively great radius and sufficient strength.

25. In a fluid turbine, a low-pressure part including a plurality of rows of stationary and moving blades passing motive fluid in substantially the same direction, means associated with said rows of stationary and moving blades to divide the latter into inner and outer tiers and to segregate the steam passing therethrough into inner and outer annular portions or belts, and a last pair of rows of stationary and moving blades receiving steam from an inner tier, the steam expanding in said outer tier or tiers and in said last pair of rows being at a different rate than in the inner tiers, all of the moving blades being tapered in thickness from the roots toward the tips whereby relatively long and adequately strong blades may be provided.

26. In a fluid turbine, a low-pressure part including a plurality of rows of stationary and moving blades passing motive fluid in substantially the same direction, means associated with said rows of stationary and moving blades to divide the latter into inner and outer tiers and to segregate the steam passing therethrough into inner and outer annular portions or belts, and a last pair of rows of stationary and moving blades receiving steam from an inner tier, the steam expanding in said outer tier or tiers and in said pair of rows being at a different rate than in the inner tiers, all of the moving blades being tapered in width from the roots toward the tips whereby relatively long and adequately strong blades may be provided.

27. In a fluid turbine, a low-pressure part including a plurality of rows of stationary and moving blades passing motive fluid in substantially the same direction, means associated with said rows of stationary and moving blades to divide the latter into inner and outer tiers and to segregate the steam passing therethrough into inner and outer annular portions or belts, and a last pair of rows of stationary and moving blades receiving steam from an inner tier, the steam expanding in said outer tier or tiers and in said last pair of rows being at a different rate than in the inner tiers, all of the moving blades being tapered in thickness and in width from the roots toward the tips whereby relatively long and adequately strong blades may be provided.

28. In a turbine, a low-pressure part having steam flowing therethrough in approximately the same direction including a plurality of rows of stationary and moving blades and means to divide one or more of the moving rows of blades into inner and outer tiers and to segregate the steam into a plurality of annular portions or belts, the outer tiers of a moving row of blades adapted to abstract energy from an annular portion and the inner tier comprising blade portions having their entry edges tapered whereby motive fluid is expanded while entering between the blade portions and the remaining portions of the blades defining passages of approximately constant width curved at the leaving edges in order to secure discharge of steam therefrom in a desired direction.

29. In a turbine, a low-pressure part having steam flowing therethrough in substantially the same direction including a plurality of pairs of rows of stationary and moving blades and means to divide one or more of the pairs of stationary and moving blades into inner and outer tiers and to segregate the steam into a plurality of annular portions, the outer tier blading designed to fully expand annular portions passing therethrough and the inner tier blading adapted to pass steam to succeeding outer tier blading and a last pair of stationary and moving blades with little loss in energy comprising stationary blade portions having large outlet angles and moving blade portions having their entrance edges tapered to define entrance steam expanding passages and the remaining portions thereof defining passages of approximately constant width curved at the discharge edges in order to secure discharge of steam in a desired direction.

30. In a turbine, a low-pressure part comprising a plurality of rows of stationary and moving blades and means to divide one or more of the rows into inner and outer tiers and to segregate the steam passing therethrough into a plurality of annular portions, an outer tier adapted to abstract energy from an annular portion and discharge the latter at exhaust pressure and an inner tier serving as a by-pass for an inner portion whereby a support for outer tier is provided.

31. In a turbine, a low-pressure part having motive fluid passing therethrough in approximately the same direction including a plurality of rows of moving blades and means for dividing one or more of said rows into inner and outer tiers, the inner tier serving to pass motive fluid with little loss in energy to succeeding outer tiers and another row of moving blades, the motive fluid being fully expanded in said last-named tiers and blades.

32. In a turbine, a low-pressure part including a plurality of rows of stationary and moving blades, means cooperating with some of said blades to divide the steam passing therethrough into annular portions or belts, the outer portions of the moving blades serving to abstract energy from some of said belts and the inner portions serving to guide some of said belts to succeeding outer portions, and rows of blades to abstract energy from the last and inner belt of steam.

33. In a turbine, the combination with the casing, of a plurality of low-pressure stages each including moving blades, wall elements supported by the blades, other wall elements supported by the casing, the wall elements constituting walls coöperating to segregate the steam into belts for the moving blades of the low-pressure stages.

34. A steam turbine comprising a casing, a rotor, one or more stages carried by the casing and rotor, a pair of rows of stationary and moving blades receiving steam from the last of said stages, wall elements for dividing the blades into inner and outer tiers for inner and outer portions of steam, a stationary row of blades supported by the casing and receiving steam from the inner tier, a wall element carried by the tips of said last-named stationary blades, the wall elements coöperating to constitute a wall to segregate the steam into inner and outer portions, the outer tier of said moving blades abstracting energy from the outer portion of steam, and a row of moving blades coöperating with the last-named stationary blades for abstracting energy from the inner portion of steam.

35. In a steam turbine having a casing and rotor, a low-pressure section including a plurality of rows of stationary and moving blades, wall elements for dividing the blades into inner and outer tiers for inner and outer portions of steam, a diaphragm supported by the low-pressure end of the casing, a stationary row of blades supported by the diaphragm and receving steam from the inner tier, a wall element carried by the tips of said last-named stationary blades, the wall elements coöperating to constitute a wall to segregate the steam into inner and outer portions, the outer tier of said moving blades abstracting energy from the outer portion of steam, and a row of moving blades coöperating with the last-named stationary blades for abstracting energy from the inner portion of steam.

36. A turbine comprising a casing provided with an enlarged low-pressure end, a rotor, a series of stages carried by the casing and rotor, means for segregating the steam discharged from the last stage of said series into a plurality of belts or portions comprising wall elements, web elements connecting the wall elements together and to the interior of the low pressure end of the casing, stationary blades connected to the casing and web elements, moving blades coöperating with the stationary blades and carried by the rotor, and wall elements carried by some of said pairs of blades, the wall elements carried by the ends of some of said stationary blades, the wall elements of the pairs of blades, the ends of the blades, and the first mentioned wall elements defining walls for the passage of belts of steam, and moving blade elements in each belt to abstract energy therefrom.

37. In a fluid turbine, a low-pressure part having the fluid flowing therethrough in substantially the same direction including a plurality of rows of stationery and moving blades, means for segregating the fluid passing therethrough into a plurality of annular portions, said annular portions passing to the exhaust from a plurality of moving blades, and means associated with the final blades to divide them into portions having different blade outlet angles.

38. In an axial flow turbine, a low-pressure part having the motive fluid passing therethrough divided into a plurality of annular portions including one or more wall elements to change the direction of flow of one or more of said annular portions from approximately an axial to approximately a radial direction and means coöperating therewith to reduce eddy effects.

39. In an axial flow turbine, a low-pressure part having the motive fluid passing therethrough divided into a plurality of annular portions including one or more wall elements to change the direction of flow of one or more of said annular portions from approximately an axial to approximately a radial direction and a circumferential guide coöperating therewith to reduce eddy effects.

40. In an axial flow steam turbine, a stage or section provided with means for dividing the steam flowing therethrough into annular portions having different ratios of expansion.

41. In an axial flow steam turbine, a stage or section provided with blading structures so arranged as to segregate the steam into separate concentric annular portions having different expansion ratios.

42. In an axial flow steam turbine, a stage or section having blades constructed in multiple tiers and arranged so that the steam flowing through the different tiers will have different ratios of expansion.

43. In an axial flow steam turbine, a low-pressure stage or section provided with blading means formed so as to segregate the steam flowing through said stage or section into separate portions having different expansion ratios.

44. In an axial flow steam turbine, a high pressure stage or section through which the steam flows in one annular body and a low pressure stage or section through which the steam flows in two or more annular bodies having different ratios of expansion.

45. In an axial flow steam turbine, a stage or section having blades constructed in multiple tiers formed so that the steam flowing through the outer tier has a greater ratio of expansion than the steam flowing through the inner tier.

46. In an axial flow steam turbine, a stage or section provided with means for segregating the steam flowing therethrough into separate portions having different ratios of expansion.

47. In an axial flow steam turbine, a stage or section having superposed concentric rings of blades so formed that the rings of blades farther from the turbine axis have outlet angles different from those of the rings of blades nearer the turbine axis.

48. In an axial flow steam turbine, a partial peripheral admission high pressure stage and a full peripheral admission low-pressure stage provided with means for segregating the steam flowing therethrough into portions having different ratios of expansion.

Signed at Manchester th 1 th day of December, 1920.

KARL BAUMANN.